(12) United States Patent
Hsieh

(10) Patent No.: US 6,527,405 B2
(45) Date of Patent: Mar. 4, 2003

(54) RELEASABLE HANDLE FOR A HAND POWERED PULLER WITH ILLUMINATION MEANS

(76) Inventor: Ching-Fong Hsieh, P.O. Box 697, Feng-Yuan City 420 (TW)

(*) Notice: Subject to any disclaimer, the term of this patent is extended or adjusted under 35 U.S.C. 154(b) by 0 days.

(21) Appl. No.: 09/880,242

(22) Filed: Jun. 11, 2001

(65) Prior Publication Data

US 2002/0186559 A1 Dec. 12, 2002

(51) Int. Cl.7 ............................................. B25B 23/18
(52) U.S. Cl. ...................... 362/119; 362/120; 362/206; 294/135; 254/369
(58) Field of Search ................................ 362/119, 120, 362/206; 294/135; 254/369

(56) References Cited

U.S. PATENT DOCUMENTS

| 2,501,253 | A | * | 3/1950 | Anglemyer | 254/369 |
| 2,669,426 | A | * | 2/1954 | Anglemyer | 254/369 |
| 2,890,857 | A | * | 6/1959 | Hoffman | 254/369 |
| 3,003,359 | A | * | 10/1961 | Maasdam | 254/369 |
| 3,724,816 | A | * | 4/1973 | Cain et al. | 254/369 |
| 3,985,342 | A | * | 10/1976 | Denman | 254/335 |
| 4,479,171 | A | * | 10/1984 | Mains | 362/102 |
| 5,772,308 | A | * | 6/1998 | Lin | 362/119 |
| 5,848,832 | A | * | 12/1998 | Hsieh | 362/119 |
| 6,086,217 | A | * | 7/2000 | Jau | 362/109 |
| 6,196,696 | B1 | * | 3/2001 | Shiao | 362/120 |

* cited by examiner

Primary Examiner—Sandra O'Shea
Assistant Examiner—Ismael Negron

(57) ABSTRACT

A handle for a hand power puller includes a transparent handle having a first chamber and a second chamber, a tubular adapter engaged into the first chamber and releasably connected the handle with a tubular projection of a fork like operator of the hand power puller, a miniature flash light removably engaged into the second chamber with a sealing engaged therebetween and a rubber cap secured to the rear end of the flash light. So that the handle is waterproof and the flash light facilitates the hand power puller can be worked in darkness or in the rain.

4 Claims, 9 Drawing Sheets

RELEASABLE HANDLE FOR A HAND POWERED PULLER WITH ILLUMINATION MEANS

BACKGROUND OF THE INVENTION

The present invention relates to the hand power puller and more particularly to a handle for operating the hand power puller which handle is releasable and has a light therein.

The hand power puller is useful to pull a car, a boat or to move a heavy machine or to pack the timbers. A typical hand power puller 10 (as shown in FIG. 1) comprises generally a roller 11 for swinging the cable or rope 12 and having a ratchet gear 13 on one lateral side operated by a fork like handle 14, a pawl 141 on the handle 14 to prevent the ratchet gear 13 from racing backward, a first and a second hooks 15 and 16 respectively to connect two ends of the cable 12. In operation, to hook the first hook 15 on a rope which may bind around a post or a tree and to hook the second hook 16 on another rope which may bind around a heavy machine. Then operate the fork like handle 14 up and down to have the hooks 15 and 16 to be centralized, therefore the machine is moving. This type of hand power puller 10 is very convenient to use. But its handle 14 is too long to pack for transportation. Because it has no any light, it is difficult to use in the night time.

SUMMARY OF THE PRESENT INVENTION

The present invention has a main object to provide a handle for a hand power puller which handle can be releasable and shortens the fork like operator in order to readily pack for transportation.

Another object of the present invention is to provide a handle for a hand power puller which handle has a miniature flash light in it to facilitate the hand power puller to be worked in the night time.

Further object of the present invention is to provide a handle for a hand power puller which handle can be removed from the fork like operator and used as a flash light.

The present invention will become more fully understood by reference to the following detailed description thereof when read in conjunction with the attached drawings.

DETAILED DESCRIPTION OF THE EMBODIMENT

Figure 6:
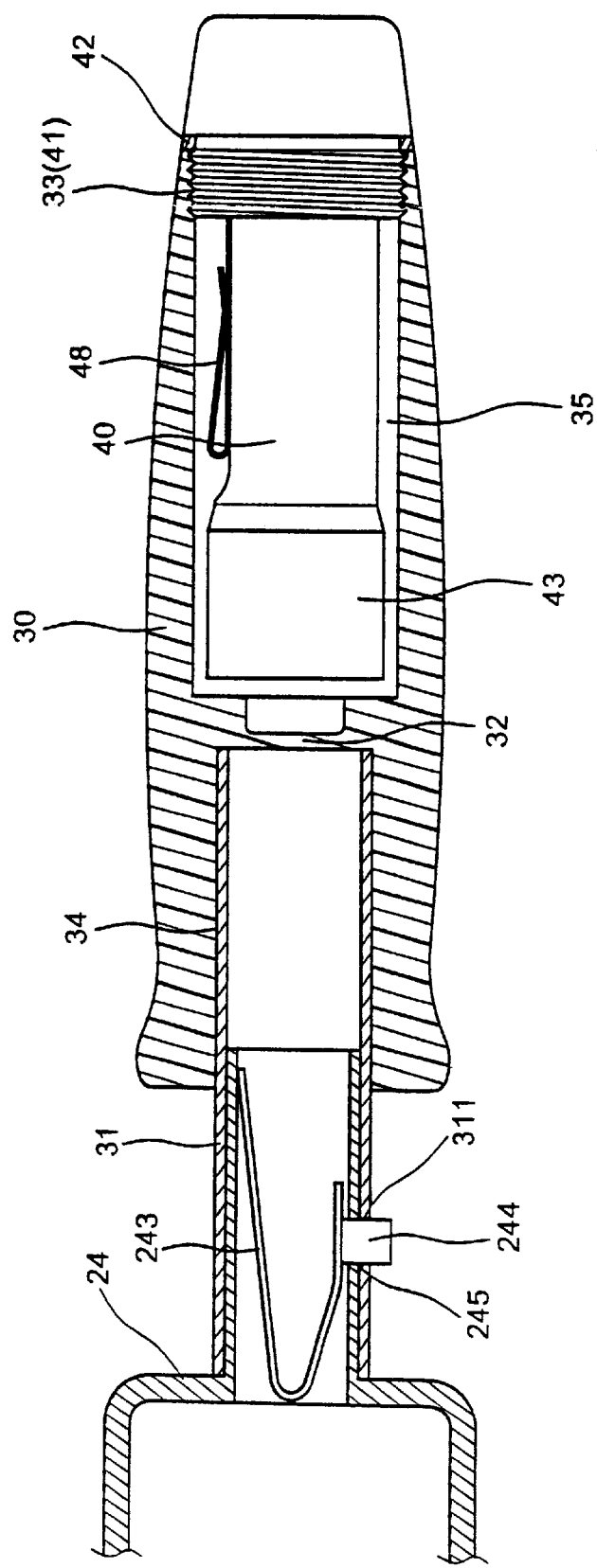
FIG. 6 is a sectional view to show the assembly of the releasable handle to the operator of the hand power puller.

With reference to FIGS. 2, 3, 4 and 5 of the drawings, the handle for a hand power puller 20 comprises a main body 21, a shaft 22 across the main body 21 for swinging the cable or rope 23 having a ratchet gear 221 on one lateral side, a fork like operator 24 pivoted to the main body 21, a pawl 241 pivoted in the fork like operator 41 engageable into the teeth of the ratchet gear 221 and controlled by an actuating plate 242, a second hook 25 connected to one end of the main body 21 under the operator 24, a first hook 26 having a puller 261 swung on the rope 23 which having one end bound on a transverse rod 262 and the other bound on the shaft 22 of the main body 21. The fork like operator 24 has a tubular projection on the top center having a roughly U-shaped spring plate 242 in it (as shown in FIG. 6). The spring plate 243 has a bead 244 on one end engaged in a first radial hole 245 in a peripheral wall thereof. A tubular adapter 31 which has a diameter slightly larger than that of the projection has a second radial hole 311 in a peripheral wall engageable with the first radial hole 245 and the bead 244 of the projection.

The present invention is characterized in a releasable handle 30 which has a hollow interior cylindrical body made of transparent rigid material, a partitions 32 inside an appropriate position to define a first chamber 33 and a second chamber 35. The first chamber 34 is frictionally engaged within the inner end of the tubular adapter 31 and the second chamber 35 is engaged within a miniature flash light 40 and has an inner threads 33 on an inner periphery abutting the outer end made engageable with the outer threads 41 on an outer periphery of the miniature flash light 40 and sealed by a sealing ring 42 therebetween. The flash light 40 has a head 43 screw fastened to the body of the flash light 40 by an outer thread 431 of the head 43 and an outer thread 401 of the body. The head 43 includes therein a reflector 44, a bulb 45, two lead-in wires 451 connected to a pair of contact plates 461 respectively, a pair of batteries 46 respectively connected to the contact plates 461 and a pair of springs 462, a conductive plate 463 connected to the springs 462, a nut 471 and a washer 472 fastened a rubber cap 473 on a push button 47 in order to prevent the water from permeating into the flash light 40 (the push button is a conventional art, here has no repetitious words to be given). The flash light 40 further has a clip on an outer periphery so that the flash light may be portable.

Figure 1:
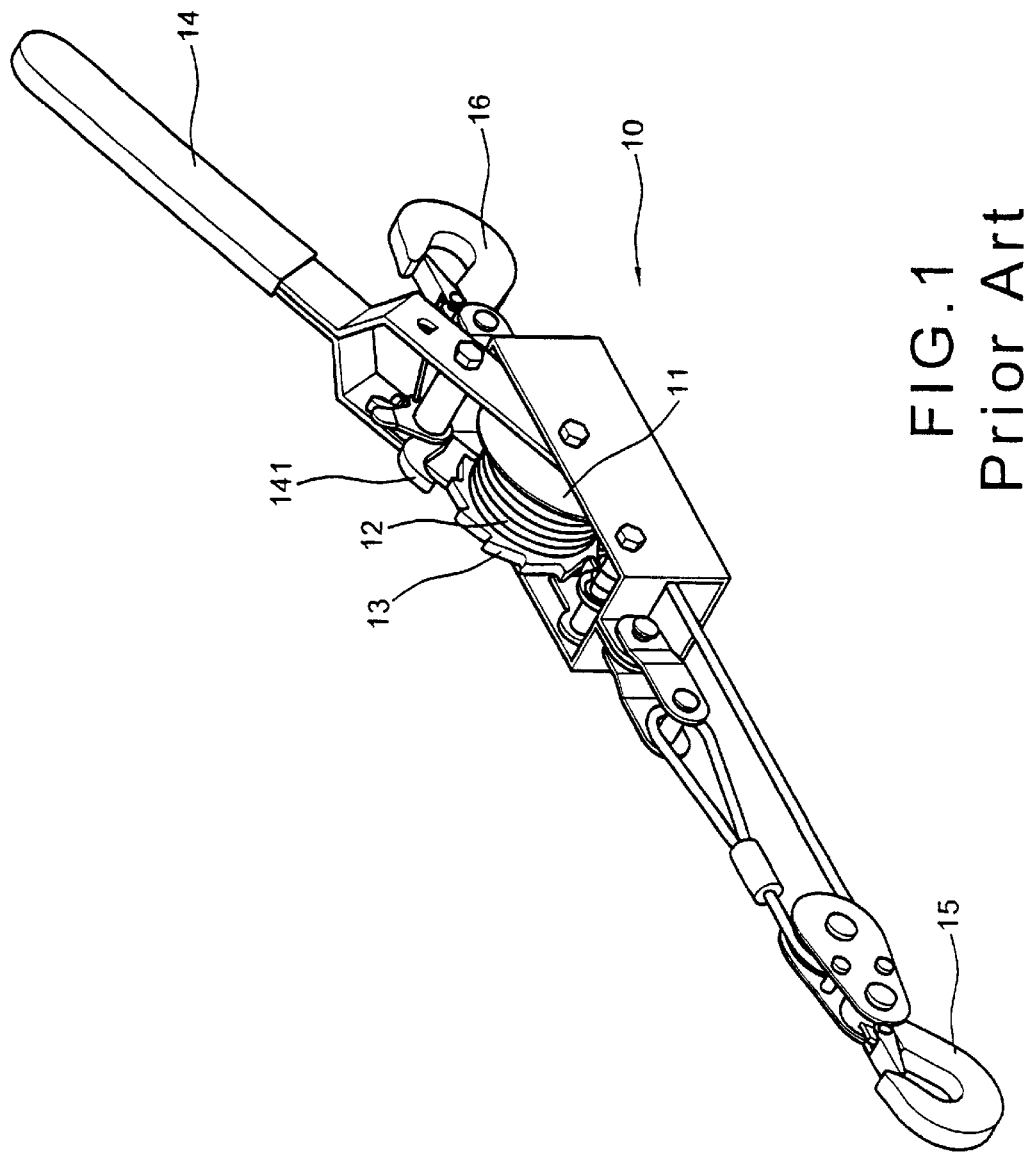
FIG. 1 is a perspective view to show a hand power puller according to a prior art.
Figure 2:
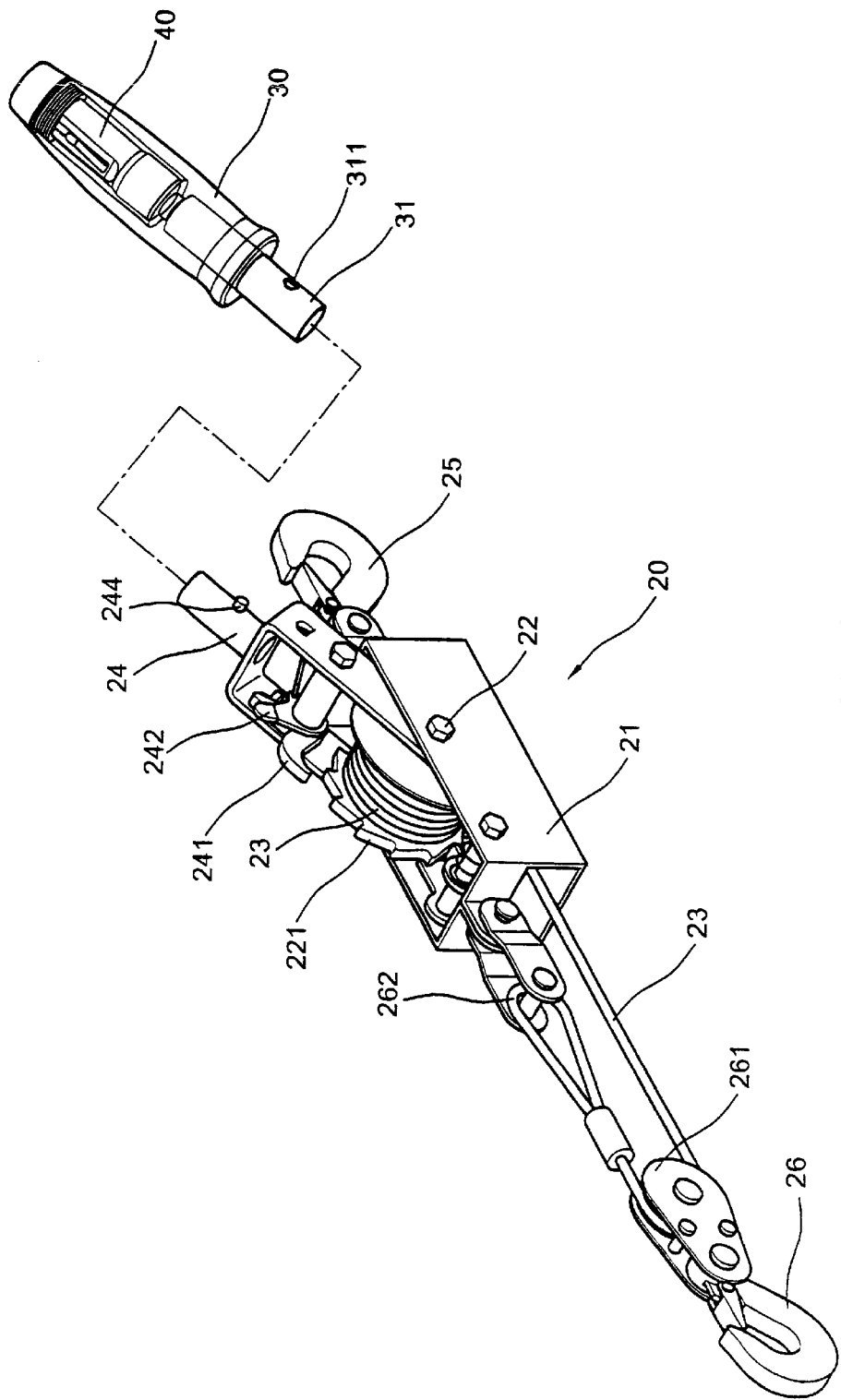
FIG. 2 is an exploded perspective to show a hand power puller and a releasable handle according to the present invention.
Figure 7:
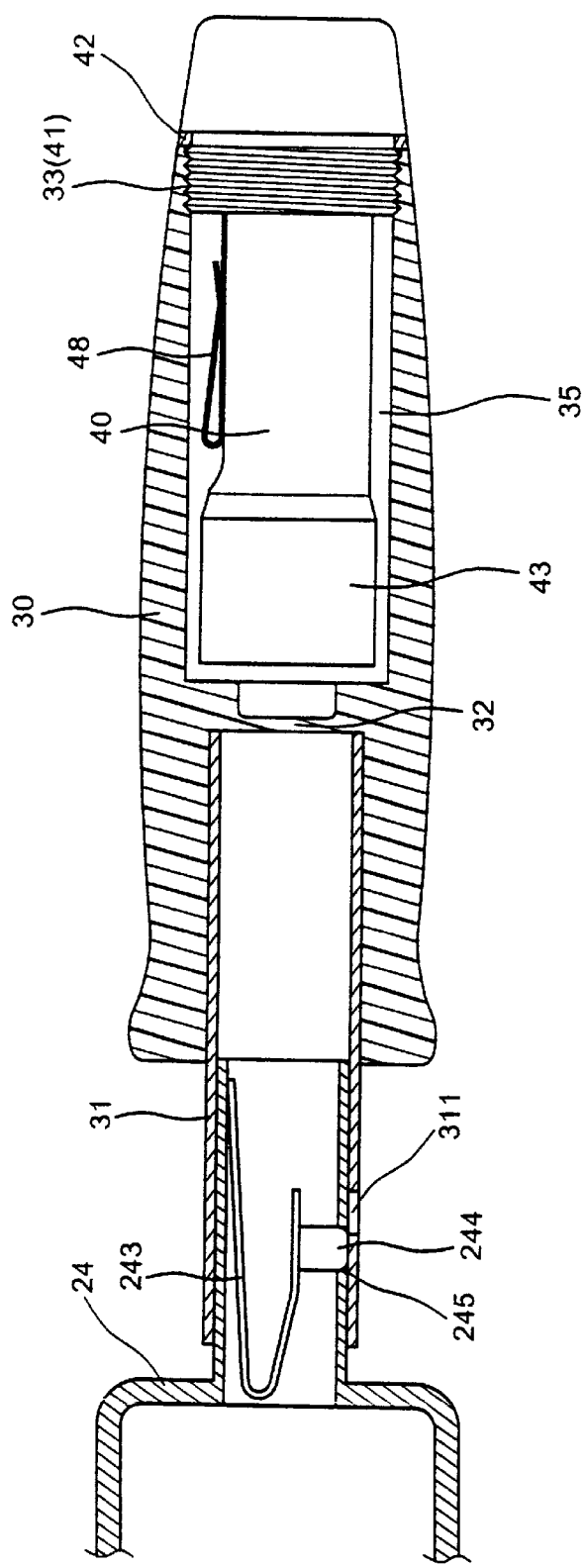
FIG. 7 is a sectional view to show the disassembly of the releasable handle with the operator of the hand power puller.

The operation of the hand power puller 40 of the present invention is similar to that of a conventional hand power puller 10. The function and purpose are also similar to each other. The only different is that the present invention provides a releasable handle 30 by which the fork like operator 24 may be shortened in order that the whole hand power puller 20 can be packed into a small box for ready transportation. When assembling or disassembling the handle 30 to the fork like operator 24, just press the bead 244 in, the process is quickly finished, very convenient (as shown in FIGS. 2, 6 and 7). When press the press button 47, the flash light is turned on. The light through the partition 32 brightens the whole hand power puller 20. So that the hand power puller 20 can be used in darkness or in night time. Because the handle 30 is transparent, it also be brightened by the astigmatic ray of light.

Figure 3:
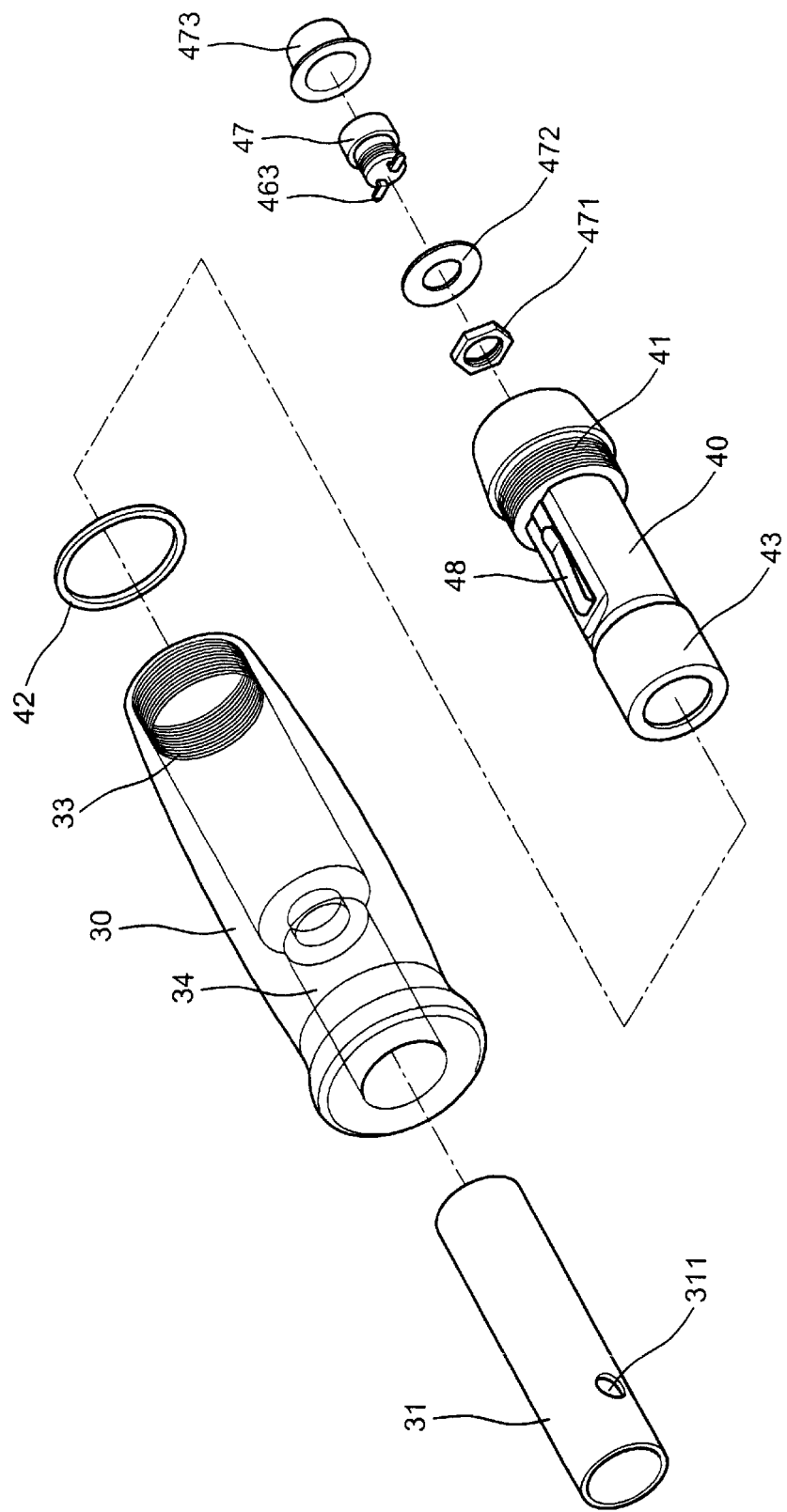
FIG. 3 is an exploded perspective view to show the releasable handle of the present invention.
Figure 4:
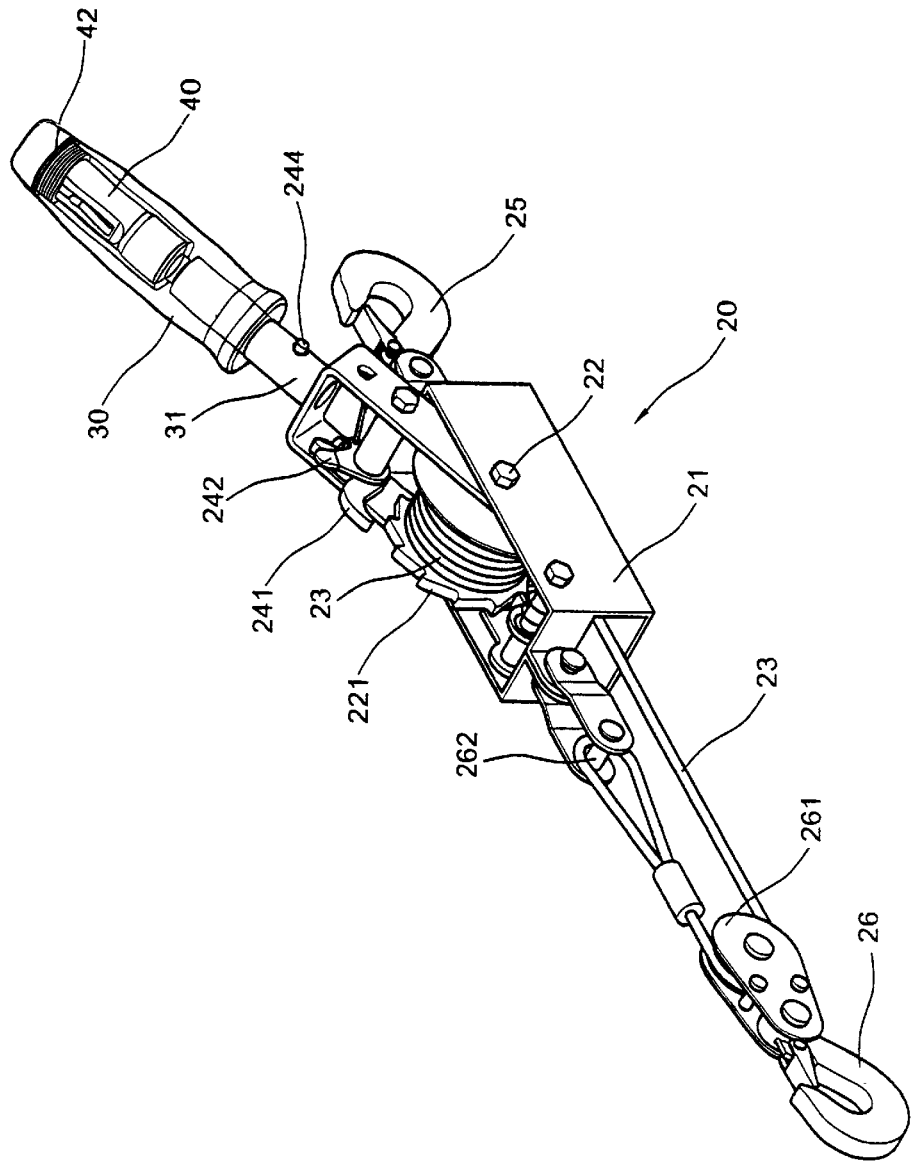
FIG. 4 is a perspective view to show the releasable handle is assembled to the hand power puller.
Figure 5:
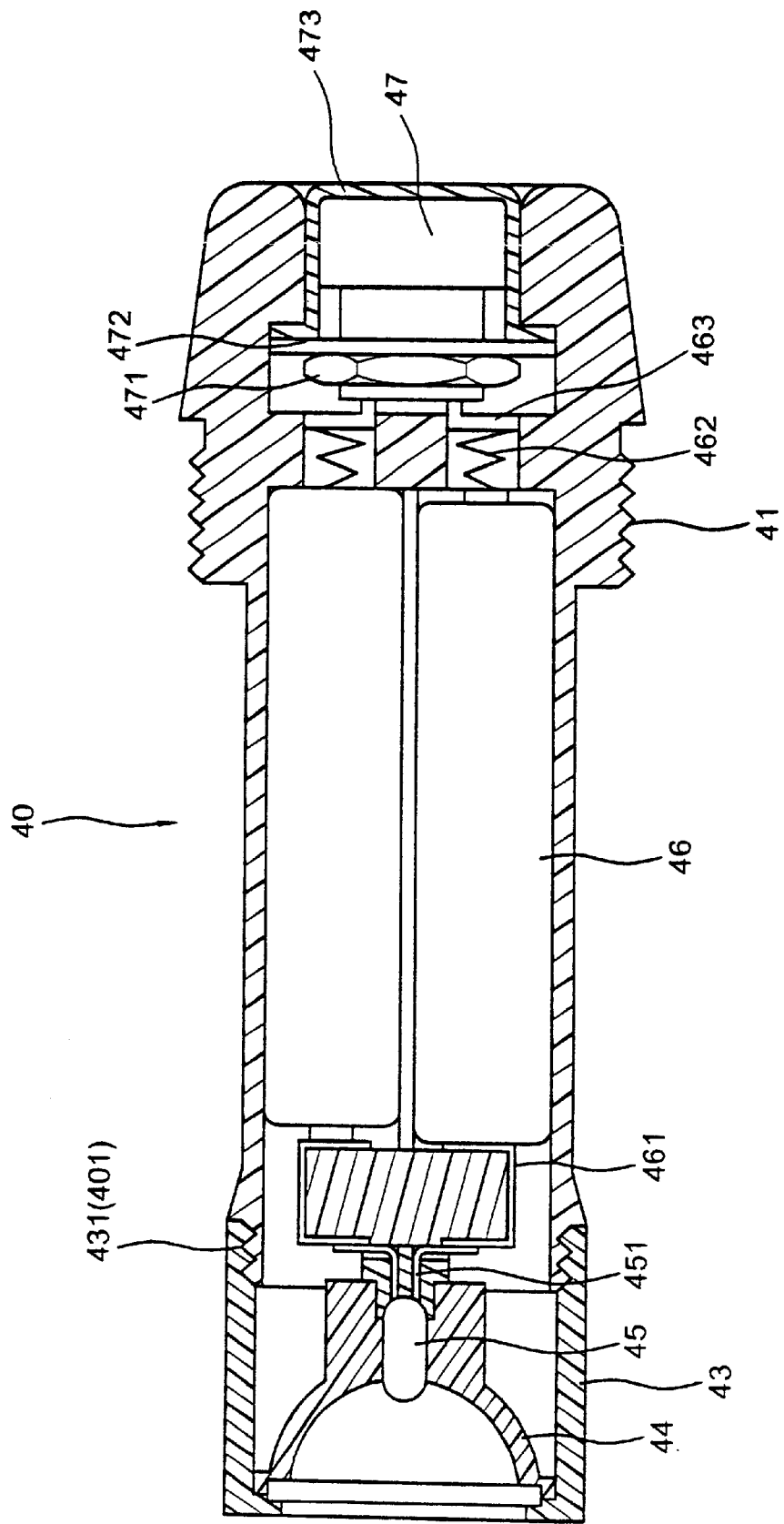
FIG. 5 is a sectional of the releasable handle.
Figure 8:
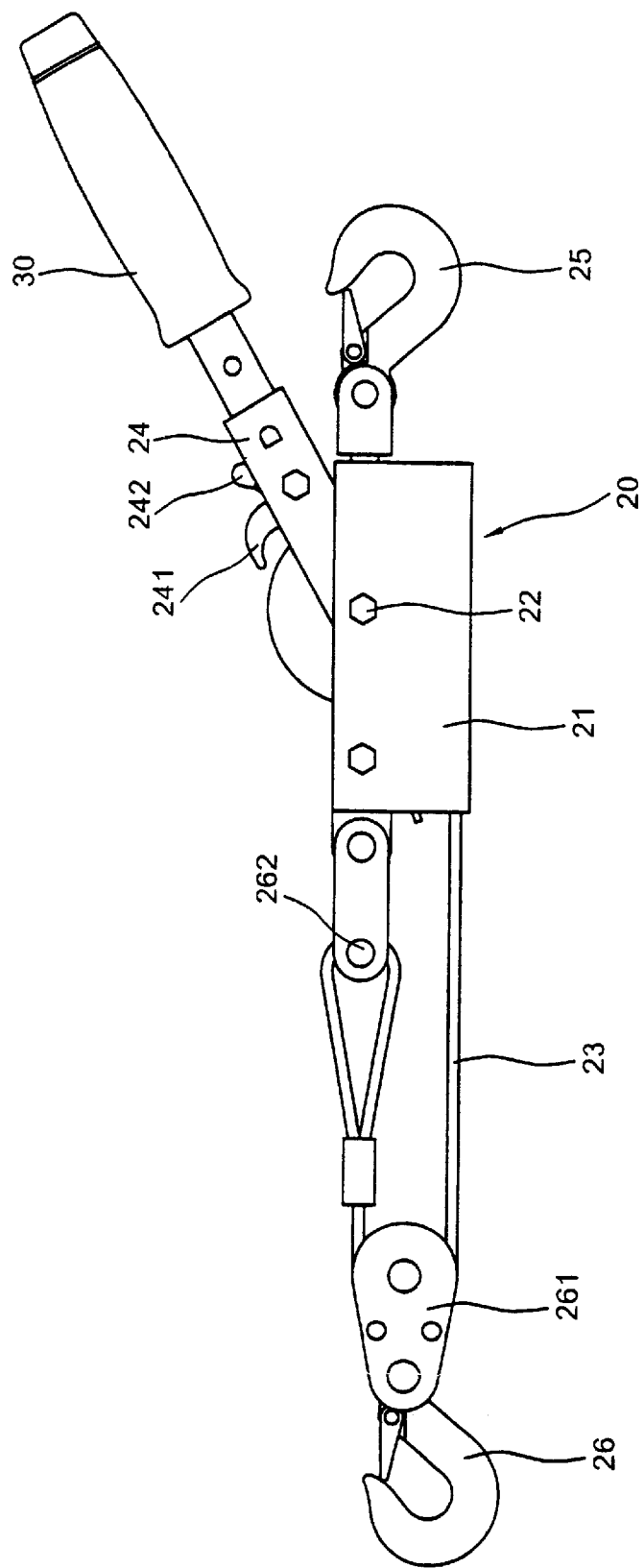
FIG. 8 is a plane view to show the assembly of the releasable handle with the operator of the hand power puller.
Figure 9:
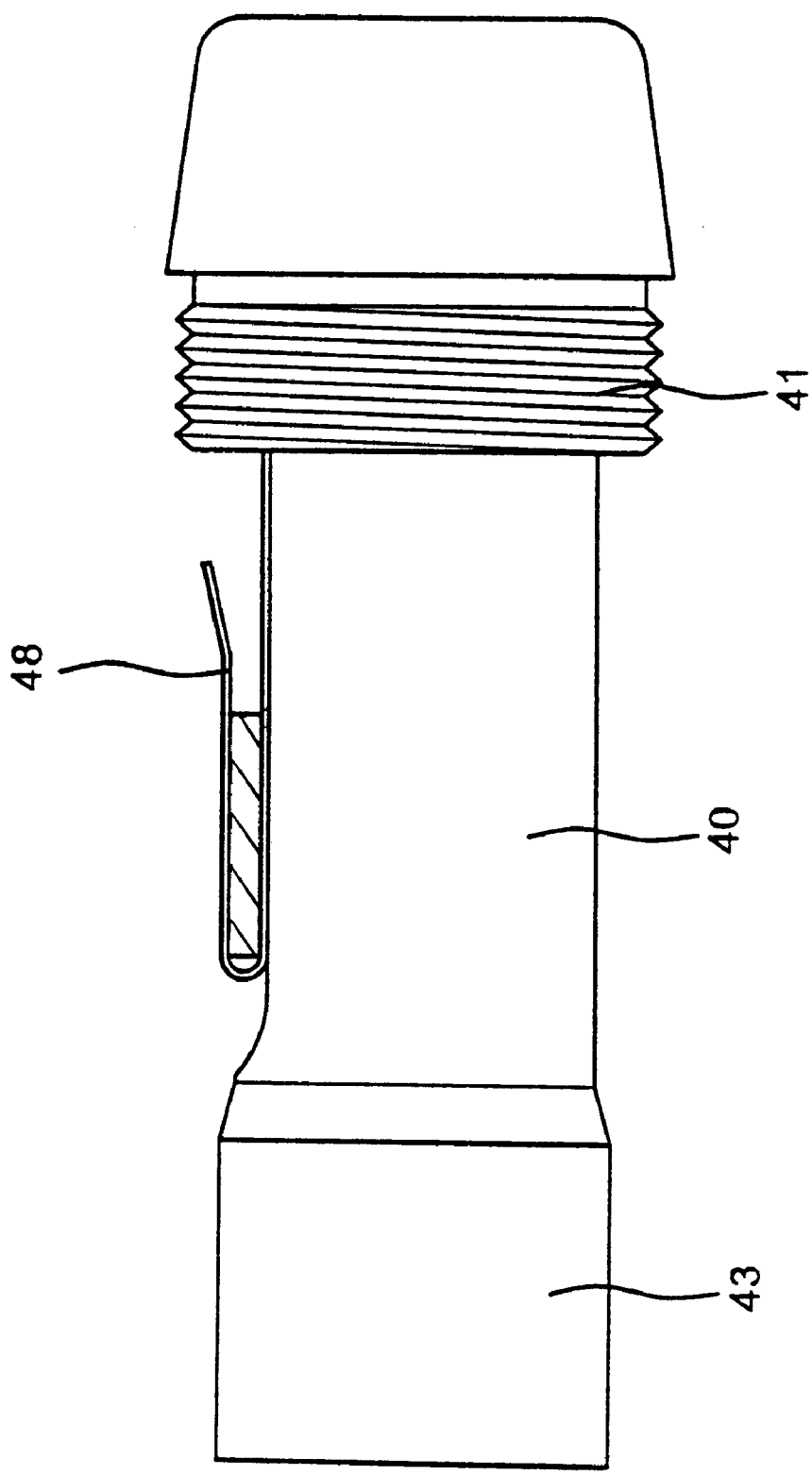
FIG. 9 is a plane view to show the miniature flash light is removed from the releasable handle.

Referring to FIGS. 3, 8 and 9 of the drawings, when unfasten the rear end of the flash light 40, it can be removed from the handle 30. Because of the clip 48, it can be portable. When the flash light 40 is still in into the handle 30 both the sealing ring 42 and the rubber cap can prevent the water from prevent into the handle 30. So that the hand power puller 20 of the present invention can be worked in the rain or in the water.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A handle for a hand power puller comprising:

a handle releasably connected to a tubular projection of a fork like operator of a hand power puller, said handle having a hollow cylindrical body, a partition in an inner wall to define a first and a second chambers, inner threads formed in an inner periphery abutting an opening of the second chamber, a tubular adapter having an inner end frictionally engaged into the first chamber stopped against the partition and an outer end having a diameter slightly larger than said tubular projection a first radial hole in a peripheral wall;

a miniature flash light screw engaged into the second chamber of the handle with a sealing ring therebetween and having outer threads on a periphery adjacent outer end engageable with the inner threads of the handle, a head screw fastened to front end thereof in which is a reflector, a bulb, a pair of lead-in wire respective connected to a pair of contact plates, a pair of batteries connected a pair of spring means and a pair of conductive plates, a press button in rear end thereof, a nut and a washer securing a rubber cap to the press button.

2. The handle as recited in claim 1 wherein said handle is made of transparent rigid material.

3. The handle as recited in claim 1 wherein said tubular projection has a first radial hole in a peripheral wall engageable with the second radial hole of the tubular adapter, a U-shaped spring plate disposed inside the tubular projection in duding bead on a lateral end engaged into the first radial hole thereof.

4. The handle as recited in claim 1 wherein said miniature flash light further has a clip on an outer periphery to facilitate the flash light to be portable.

* * * * *